United States Patent

Baukloh et al.

[11] Patent Number: 6,041,828
[45] Date of Patent: Mar. 28, 2000

[54] INTERNALLY TIN-COATED COPPER PIPE AND METHOD FOR COATING A COPPER PIPE

[75] Inventors: Achim Baukloh, Bad Iburg; Ulrich Reiter, Osnabrück, both of Germany

[73] Assignee: KM Europa Metal Aktiengesellschaft, Osnabrück, Germany

[21] Appl. No.: 08/996,757

[22] Filed: Dec. 23, 1997

[30] Foreign Application Priority Data

Dec. 23, 1996 [DE] Germany .......................... 196 53 765

[51] Int. Cl.[7] .............................. C23C 3/02; F16L 58/04; F16L 9/14
[52] U.S. Cl. ......................... 138/145; 138/143; 427/426
[58] Field of Search ..................................... 138/143, 145, 138/146; 427/239, 436, 437; 174/36; 204/196.3; 285/286; 228/198, 200; 205/776.5

[56] References Cited

U.S. PATENT DOCUMENTS

| | | | |
|---|---|---|---|
| 3,943,616 | 3/1976 | Smith et al. | 29/157 R |
| 4,234,631 | 11/1980 | Davis | 427/437 |
| 4,269,625 | 5/1981 | Molenaar | 427/437 |
| 5,248,527 | 9/1993 | Ichida et al. | 427/437 |
| 5,296,268 | 3/1994 | Iantosca | 427/437 |
| 5,302,256 | 4/1994 | Miura et al. | 427/437 |
| 5,769,129 | 6/1998 | Kuroda et al. | 138/143 |

*Primary Examiner*—Andres Kashnikow
*Assistant Examiner*—Davis Hwu
*Attorney, Agent, or Firm*—Kenyon & Kenyon

[57] ABSTRACT

A copper installation pipe having a tin coating that is applied with temperature control so as to be adherent over the entire inner surface. The thickness of the intermetallic phase formed at the transition from the copper pipe to the tin coating is less than 20%, preferably less than 5% of the overall coating thickness. In addition, a method for coating an installation pipe using chemical treatment, where the temperature of the tinning solution is selectively varied. To ensure the smallest possible intermetallic phase at the copper surface, one begins the tinning process at a low temperature. This promotes the formation of a large number of uniformly distributed nuclei of crystallization having the same orientation. The temperature is then selectively adjusted to promote crystal growth, the result being that the crystals grow rapidly with the orientation remaining constant. One then achieves a dense tin coating having a minimal exposed surface area.

10 Claims, No Drawings

INTERNALLY TIN-COATED COPPER PIPE AND METHOD FOR COATING A COPPER PIPE

BACKGROUND OF THE INVENTION

1. Field of the Invention

The present invention relates to a copper installation pipe having a tin coating that adheres to the entire inner surface, as well as to a method for coating a copper pipe.

2. Description of the Prior Art

Copper installation pipes have proven to be successful for all supply lines in house installations, in particular, for those used in supplying of drinking water. To reduce the amount of copper ions released into the water, seamlessly drawn copper pipes having a tin-coated inner surface are sometimes used. Installation pipes of this type meet the certain legal or regulatory requirements for all drinking water, with respect to the maximum limit of copper ions released into the water of 3mg/l following twelve hours of stagnation in the pipe conduit.

A conventional method for coating the interior surfaces of copper pipes with tin is the chemical deposition of tin on the interior surface of the copper pipes, as described, for example, in U.S. Pat. No. 2,282,511.

To this end, the copper pipe is rinsed with a chemical tinning solution. The deposition of tin takes place then by simple chemical metal displacement (or ion exchange). Copper ions are released from the base metal and, at the same time, an equivalent amount of tin ions are precipitated out of the tinning solution. This takes place under the influence of a potential existing between the tinning solution and the copper. There is no need for an external voltage or an electric current to create this potential.

The advantages of chemical tinning are manifested in its simple method of operation, with comparatively low expenditure for equipment, as well as in the possibility of depositing tin on the insides of the copper pipes, which otherwise are difficult to access.

What is disadvantageous, however, with chemical tinning is the fact that the tin ions are exchanged for copper ions as a function of the potential difference existing between the tinning solution and the copper pipe. Therefore, the deposition rate decreases as a function of the applied coating thickness, resulting in production of an inhomogeneous layered structure. The reaction comes to a standstill, as soon as the base metal is completely covered by the coating.

It can also be ascertained that the tin crystals grow with relative positional disorder during the tinning process. This produces a large, exposed tin layer surface, promoting the release of tin ions into the water during later use of the installation pipes. This also has an adverse effect on the corrosion resistance of the tin layer.

Due to fluctuations in the quality of drinking water, as often occur in practical, everyday use, one endeavors to further reduce the release of copper ions into the water intended for human consumption, by tin-coating the interior of the copper pipes. At the same time, the release of tin ions in the internally tin-coated copper pipe must be minimized. This applies, in particular, to water having a low pH-value or a large concentration of free carbonic acid ($K_{B\ 8.2} > 1.0$ mol/m$^3$).

SUMMARY OF THE INVENTION

Therefore, the underlying object of the present invention is to produce an installation pipe of copper having an improved inner tin coating, which is also resistant to aggressive water or liquids. A further object of the invention is to provide a method for coating copper pipes, which will render possible a homogeneous and compact structure of the inner tin coating.

DETAILED DESCRIPTION OF THE INVENTION

In accordance with the present invention, on the interior surface, the copper installation pipe has a tin coating that is adherent over the entire surface and is applied with temperature control. In the case of the present invention, the thickness of the intermetallic phase formed at the transition or junction from the copper pipe to the tin coating is less than 20%, preferably less than 5% of the overall coating thickness.

An alloy coating containing the intermetallic phases is formed at the transition between the copper pipe and the tin coating. This coating does, in fact, contribute to the tin coating's good adhesive strength, but it is brittle, which is a drawback as far as the technical use of the installation pipes is concerned. Such drawbacks, from a standpoint of technical applications, are minimized when the installation pipe of the present invention is used.

The thickness of the intermetallic phase is conceived in accordance with the present invention, on the one hand, so as to ensure an inner bond between the copper pipe and the tin coating and, on the other hand, so as to ensure that the brittleness of the intermetallic phase does not have an adverse effect on the technical use of the installation pipe.

In conformance with the specific installation pipe requirements, the overall coating thickness can be between 0.05 μm and 1.5 μm. The thickness of the intermetallic phase can be influenced by controlling the temperature of the tinning process. It is also conceivable to selectively influence the composition of the intermetallic phase (e.g., $Cu_6Sn_5$).

In accordance with an embodiment of the invention, the copper concentration of the tin coating in the area facing the pipe axis, thus at the water-side surface, is less than 10%. The concentration is preferably 3%. Thus, a tin coating is provided which is pure and has a low concentration of copper.

The fact that the deposited tin crystals have a small particle size and a globulite form has a particularly advantageous effect on the consistency of the exposed surface of the tin coating. The crystals are sphere-like, with roughly the same diameter in all directions, making possible compact packing.

In one especially advantageous embodiment of the installation pipe of the present invention, the average particle size of the tin crystals in proportion to the overall coating thickness amounts maximally to one third of the overall coating thickness.

The tin coating that is applied with temperature control is characterized by small crystals, packed uniformly side-by-side. This results in a substantially smaller exposed coating surface.

The tin coating of the installation pipe of the present invention exhibits excellent adhesive strength and corrosion resistance. The homogeneity and the fine-granular structure of the tin coating minimize the surface area vulnerable to corrosion by the liquids transported in the pipes. This ensures that the amount of copper ions released lies clearly below the permissible maximum value. Also minimized are the solubility of the tin and, thus, the amount of tin ions released.

Last of all, the installation pipe of the present invention has the distinction of high resistance of the tin coating to mechanical stress.

The method of the present invention is such that the temperature of the tinning solution is varied to conform to the purposes at hand, so as to produce a homogeneous, dense and compact tin coating.

In this case, the tinning process begins with the formation of a large number of uniformly distributed nuclei of crystallization having the same orientation. The temperature is then selectively adjusted to promote crystal growth, the orientation of the growing crystals remaining constant.

Thus, following the first step, in which the orientation of the crystals is defined, conditions are produced which lead to a rapid growth of the crystals having the same orientation. As a result, one obtains a tin coating having a homogeneous, packed structure and, in fact, in a process-optimized, short tinning time. This leads, in particular, to a significant reduction in the production costs.

The temperature of the tinning solution during a first rinsing operation may be lower than in a subsequent rinsing operation.

To ensure a smallest possible intermetallic phase at the copper surface, one begins the tinning process at a low temperature. In a subsequent rinsing operation, one selects a highest possible temperature to attain a high deposition rate and the desired coating thickness.

The temperature control can be carried out in steps. In this context, the copper pipe to be tin-coated is first thoroughly rinsed with a tinning solution having a temperature of between 35° C. and 45° C. In a second rinsing operation, the temperature of the tinning solution then lies between 70° C. and 85° C.

One especially advantageous specific embodiment of the general inventive idea is characterized by the temperature of the tinning solution during the thorough rinsing process being continuously raised from a temperature of between 35° C. and 45° C. to a temperature of between 70° C. and 85° C.

The temperature can be raised, e.g., by a continuous-flow heating of the tinning solution. In this case, one can adjust as a function of time, the deposition rate and the particle size of the tin crystals that are aspired to.

It can also be beneficial to adjust the chemical composition of the tinning solution to the temperature-controlled tinning operation.

The method of the present invention can be carried out quite economically in a continuous manufacturing process. As a base material, a copper pipe is prepared, which is preferably rolled up in coils of several hundred meters in length. This pipe is initially degreased on the inside using an alkaline or an acid cleaning agent. Following the degreasing operation, the copper pipe is pre-rinsed with water. This is followed by an additional pretreatment of the interior surface of the copper pipe by pickling, e.g., using potassium persulphate.

The pickling process is optionally followed by a rinsing process with completely desalinated water. Conceivable also is the application of a pickling or scouring agent, which is compatible with the tinning solution used, so that there is no need to repeat the rinsing operation.

Since initially the copper concentration in the deposited tin is supposed to be kept very low, it can be advantageous for the copper pipe to enter at a cold temperature into the tinning process. This can be achieved, for example, in that the pickle or the subsequent rinsing water is cold.

Following the pretreatment, the temperature-controlled tinning process is undertaken, in which the copper pipe is thoroughly rinsed with a chemical tinning solution. In this case, the rate of deposition out of the tinning solution, as well as the particle size and the packing structure of the tin coating are regulated by a temperature adjustment or control.

Following the tinning operation, the copper pipe is rinsed cold or hot, and is dried.

A measure that continues with the general inventive idea is that the tinning process is ended with a tinning solution, whose temperature is lowered with respect to the temperature of the tinning solution of the preceding rinsing operation.

The duration of the tinning operation and the lowering of the temperature of the tinning solution are so defined in this context that tin is even deposited during the final rinsing operation. By this step, the surface of the tin coating can be further improved with respect to structure and tightness. Furthermore, large whiskers are prevented from forming. Therefore, the formation of an interior tin coating surface that is low in copper and is dense is favored.

We claim:

1. An installation pipe, comprising:
   a copper pipe having an inner surface, the copper pipe comprising a tin coating that is applied to the copper pipe with temperature control, the tin coating adhering over the entire inner surface, the tin coating comprising a thickness, the tin coating comprising an intermetallic phase formed at the transition from the copper pipe to the tin coating, the intermetallic phase comprising a thickness, the thickness of the intermetallic phase being less than 20% of the tin coating thickness.

2. The pipe of claim 1, wherein:
   the thickness of the intermetallic phase being less than 5% of the tin coating thickness.

3. The pipe of claim 1, wherein:
   the copper concentration of the tin coating in an area facing an axis of the pipe is less than 10%.

4. The pipe of claim 1, wherein:
   the copper concentration of the tin coating in an area facing an axis of the pipe is less than 3%.

5. The pipe of claim 1, wherein:
   the tin coating comprises tin crystals, and wherein an average particle size of the tin crystals is, at a maximum, one-third of the tin coating thickness.

6. A method for coating a copper installation pipe with an internal tin coating that is adherent over an entire inner surface of the copper installation pipe, comprising:
   thoroughly rinsing the interior of the copper pipe with a tinning solution; and
   varying the temperature of the tinning solution.

7. The method of claim 6, wherein:
   the rinsing includes a first rinsing operation and a subsequent rinsing operation, and wherein the temperature of the tinning solution during the first rinsing operation is lower than during the subsequent rinsing operation.

8. The method of claim 7, wherein:
   the first rinsing operation includes thoroughly rinsing the copper pipe with a tinning solution having a temperature of between 35° C. and 45° C., and the subsequent rinsing operation includes thoroughly rinsing the copper pipe with a tinning solution of a temperature between 70° C. and 85° C.

9. The method of claim 6, wherein:
   the temperature of the tinning solution during the thorough rinsing is continuously raised from a range of between 35° C. and 45° C. to a range of between 70° C. and 85° C.

10. The method of claim 6, wherein:

the rinsing includes a first rinsing operation and a subsequent rinsing operation, and wherein the temperature of the tinning solution during the subsequent rinsing operation is lower than during the first rinsing operation.

* * * * *